United States Patent
Charrin et al.

[19]

[11] Patent Number: 6,018,908
[45] Date of Patent: Feb. 1, 2000

[54] BOUQUET PRESENTATION DEVICE

[76] Inventors: Philippe Charrin; Andre Charrin, both of Les Chirouzes, F-26600 Beaumont Monteux, France

[21] Appl. No.: 08/945,694

[22] PCT Filed: May 23, 1996

[86] PCT No.: PCT/FR96/00774

§ 371 Date: Nov. 21, 1997

§ 102(e) Date: Nov. 21, 1997

[87] PCT Pub. No.: WO96/37133

PCT Pub. Date: Nov. 28, 1996

[30] Foreign Application Priority Data

May 24, 1995 [FR] France ................................. 95 06402

[51] Int. Cl.⁷ ................................. A01G 5/02; A47G 7/02
[52] U.S. Cl. .......................................... 47/41.01; 206/423
[58] Field of Search .................... 47/65, 66.1, 66.3, 47/72, 84, 41.11, 41.13, 901, 41.01, 41.12, 30; 206/423; 428/23, 27; 229/100, 116.1, 87.18, 87.19; 220/690

[56] References Cited

U.S. PATENT DOCUMENTS

| | | | |
|---|---|---|---|
| 754,248 | 3/1904 | Simpson | 47/70 |
| 2,540,707 | 2/1951 | Beukelman | 47/72 |
| 4,054,166 | 10/1977 | Burke | 206/423 |
| 5,060,798 | 10/1991 | Braastad | 206/423 |
| 5,410,856 | 5/1995 | Weder et al. | 53/397 |
| 5,615,532 | 4/1997 | Weder et al. | 53/399 |
| 5,836,447 | 11/1998 | Garcia et al. | 206/423 |

FOREIGN PATENT DOCUMENTS

| | | |
|---|---|---|
| 1 042 436 | 11/1953 | France . |
| 2 286 759 | 4/1976 | France . |
| 2 619 698 | 3/1989 | France . |
| B-11 31 043 | 6/1962 | Germany . |
| 2 128 083 | 4/1984 | United Kingdom . |

*Primary Examiner*—Robert P. Swiatek
*Assistant Examiner*—Son T. Nguyen
*Attorney, Agent, or Firm*—Oliff & Berridge, PLC

[57] ABSTRACT

The invention provides a variable shape device, with or without a base, for presenting all types of bouquets individually, vertically and without water. The device (1) is made of water- and deformation-resistant materials, with an adjustable attachment means having a male (3) and a female portion (4). The assembled device has a tapered portion (5) with tabs (11), which adapts to every type of bouquet, and a stable base (2). The openings (6) enable the bouquet to be initially retained in the device, for individual presentation, by any fastening means inserted in the openings. A water-tight decorated sheet (8), extending towards the top (5) of the outer walls (1) and adhering to members (7), is retained by a ribbon (21) on blade members which holds together the sheet, the device and the bouquet, the sheet providing water-tightness to the device (8). Water (10) introduced into the device collects at its base (2), thus providing stability to the bouquet and converting the device into a disposable flower-pot. In the same way, a cylindrical sleeve (20) provides for the transport, by air or by road, with very little water of a bunch of 40 flowers from the producing country to a buyer country.

11 Claims, 6 Drawing Sheets

BOUQUET PRESENTATION DEVICE

BACKGROUND OF THE INVENTION

The invention relates to a device for individual presentation of bouquets of flowers, consisting of a quick to assemble, rigid technical part, for presentation of individual bouquets, acting as a simple support for bouquets of cut flowers and as support for bouquets of dried flowers in a florist's or self-service shop, and offering the possibility of transformation, by fitting of a watertight sheet, into a bouquet with a water reserve, guaranteeing perfect stability due to its conical shape and the addition of water. It thereby becomes a throwaway vase. Round or square collars can be fitted onto the device and transform it into a disposable flower-bowl.

SUMMARY OF THE INVENTION

The present invention relates to a device delivered flat which is fast to assemble, or already assembled in a volume able to be adapted to any bouquet of cut flowers as a support for storage or sales presentation, by its different round, square, triangular or other shapes, with or without base.

This device folded with its bouquet, in all watertight sheets commonly used in the horticultural or florists' world, once in shape can contain a water reserve whose weight at its base ensures perfect stability with a water height for transport of 2 cm.

The principle according to the invention enables a bouquet folded with the water reserve contained in its packaging to be transported from the place of sale to its destination ensuring its conservation until it reaches the final customer, throughout the journey without wilting. It is easy to compensate the evaporated water, without having to use a vase throughout its lifetime. The florist can add professional preservatives, or simple colouring or gelatinizing agents to improve the presentation.

It can be simply placed on a piece of furniture or on any flat surface. This invention will enable the florist to be able to offer his customers a possibility of personal decoration and to increase his sales, by the possibility of lighting and of colouring the water; which was not possible before. By printing on the sheet, the florist can match the latter to the colour of the bouquet and print his logo or name on it. The decorative effect can be improved by adding coloured sheets, placed under the cone, either flat or ruffled.

Once the flowers have withered, the final consumer throws the whole assembly away without having had to undo the packaging.

BRIEF DESCRIPTION OF THE DRAWINGS

The present invention will be better understood by referring to the following figures.

DETAILED DESCRIPTION OF PREFERRED EMBODIMENTS

Figure 1:
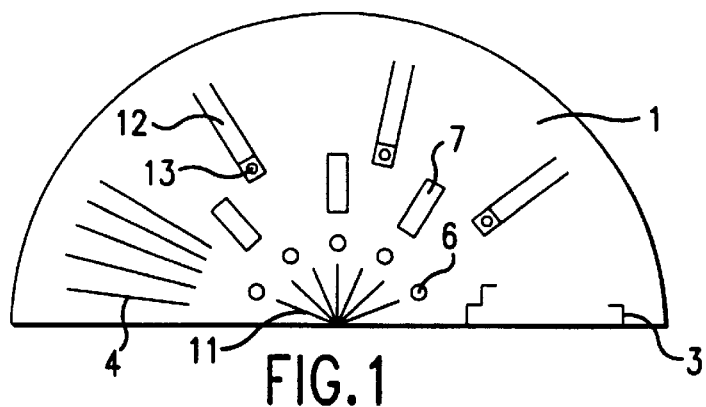
FIG. 1 representing the device flat.
Figure 2:
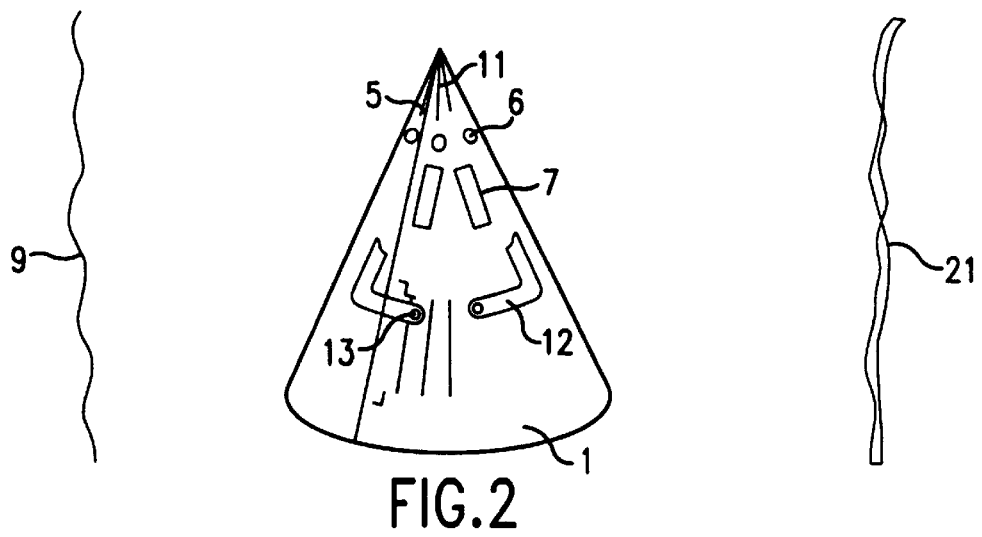
FIG. 2 representing the device formed with laces and ribbons.
Figure 3:
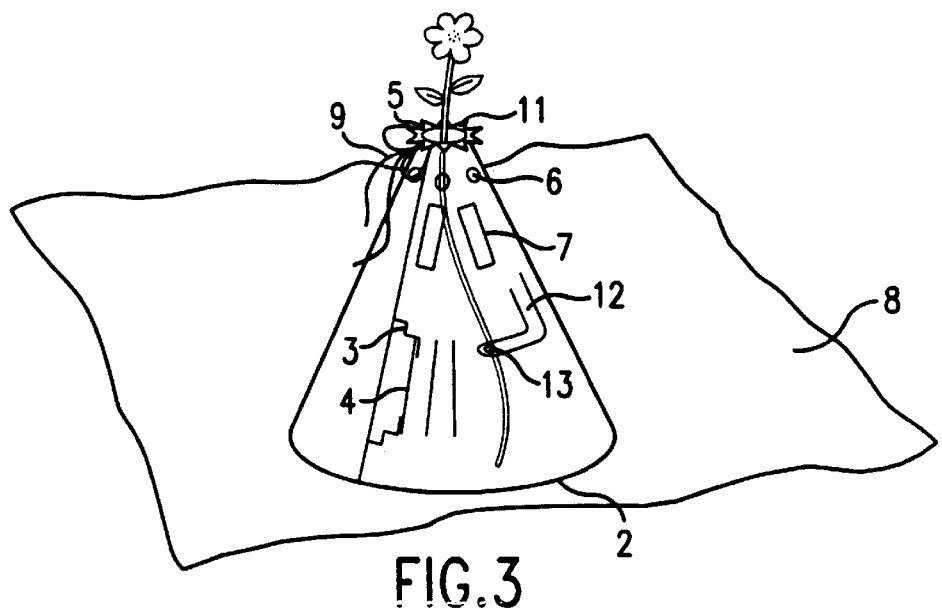
FIG. 3 representing the device ready for use with its packaging sheet and its flowers.
Figure 4:
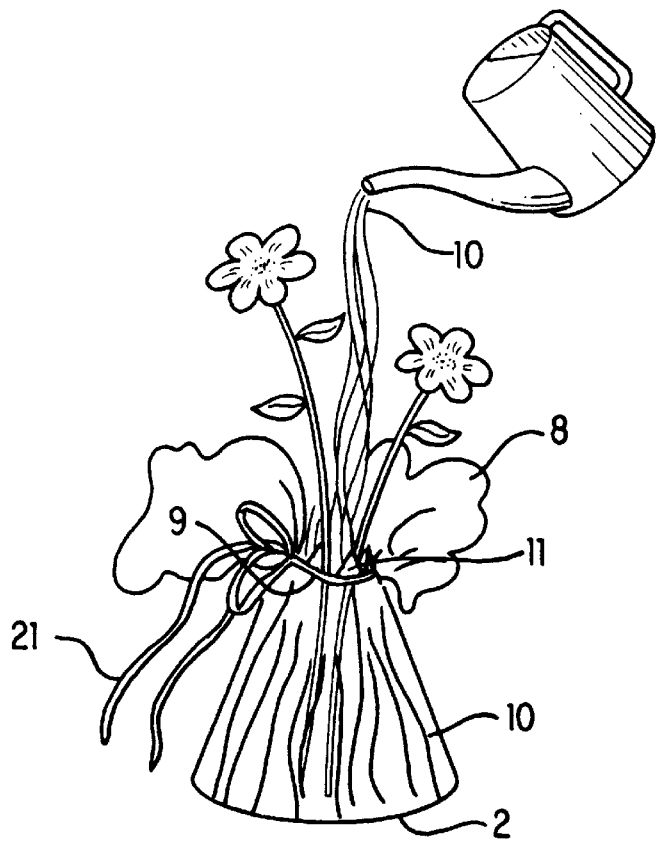
FIG. 4 representing the device assembled with its bouquet and filling.
Figure 12:
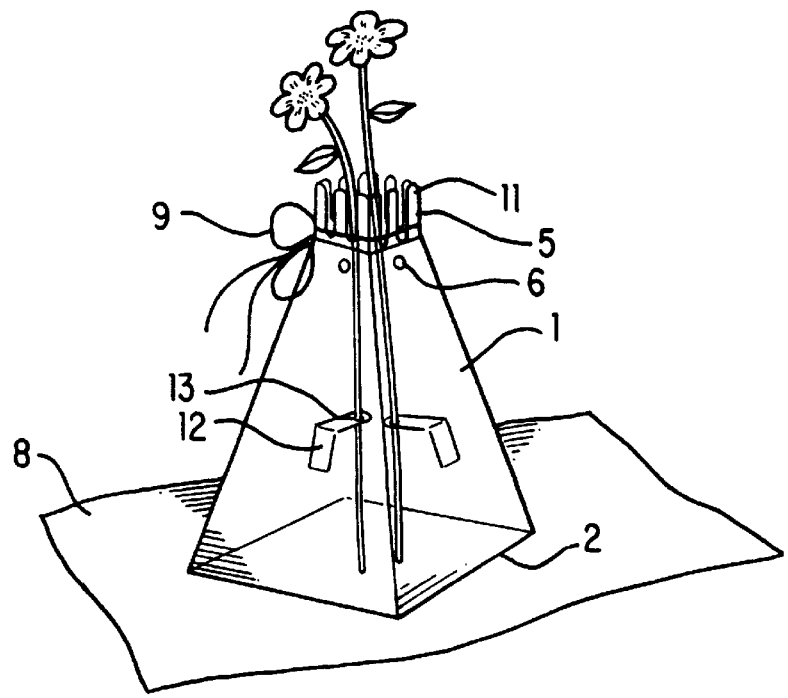
FIG. 12 representing the square device assembled with its sheet.
Figure 5:
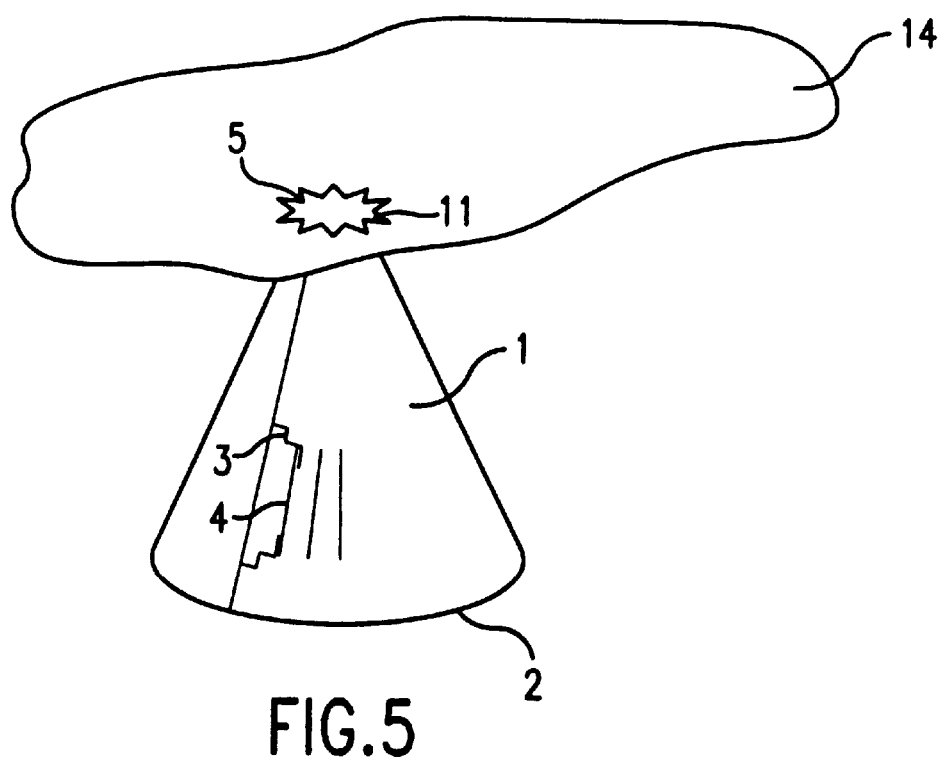
FIG. 5 representing the device with its round collar for horizontal presentation.
Figure 6:
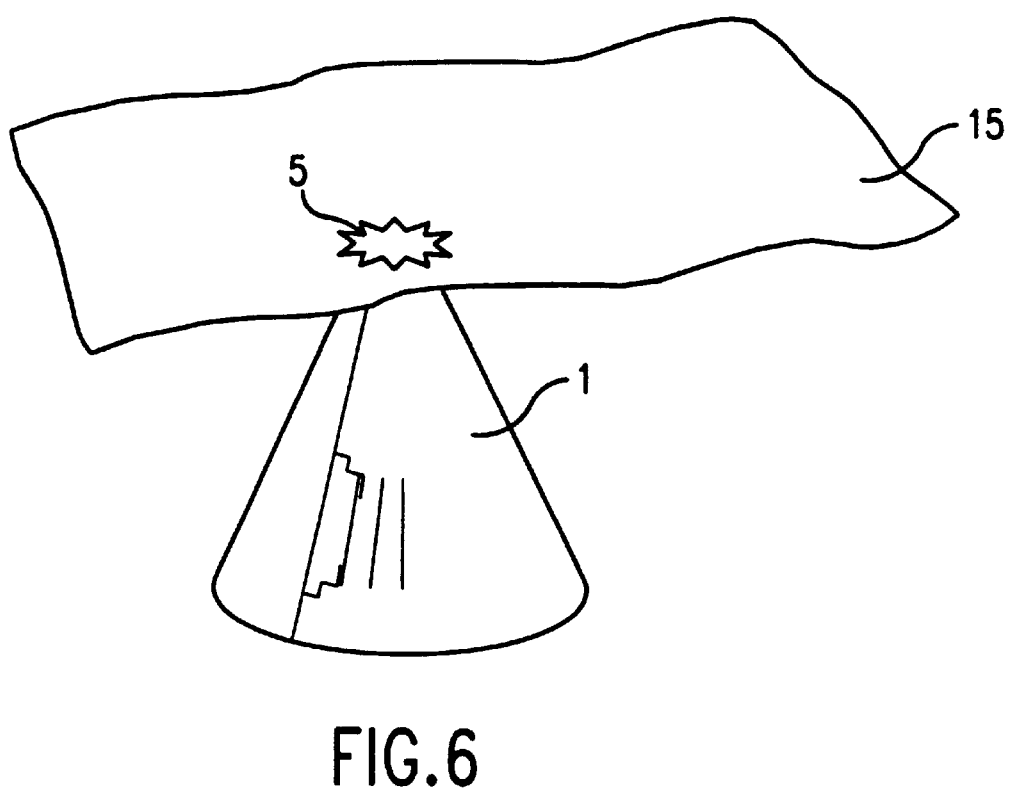
FIG. 6 representing the device with its square collar.

The support (1) is composed of rigid, water-resistant, translucent or transparent sheets, of sufficient thickness to ensure that the water and bouquet are kept in a rigid volume.

The object of the invention is to achieve a technical part of different heights for any bouquet of any flowers, enabling the latter to be presented individually, vertically, and without water.

Obtained by cutting, thermoforming or injection, the flat shape (1) before being shaped into a volume is transformed by the system of clipping (3) and adjustment (4),into a conical shape which is narrow at the top (5) provided with tongues (11) pressing on the stalks of the flowers, and wide at the bottom (2) of different diameter and adapting to suit the bouquet. The openings (6) enable a first fixing of the bouquet to the device before the sheet (8) is fitted by any tie (9) slid into said openings, and enable the bouquet to be secured for an individual, vertical presentation.

Figure 7:
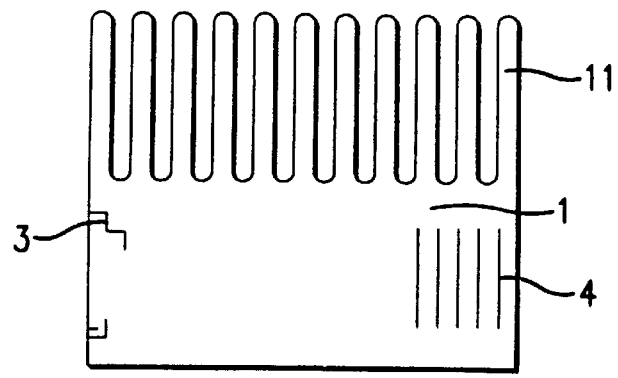
FIG. 7 representing the device flat, for preservation during transport by land or air for producing countries not having any local consumption.
Figure 8:
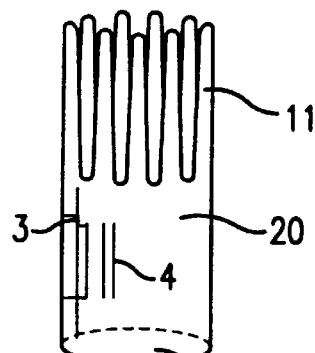
FIG. 8 representing the device formed.
Figure 9:
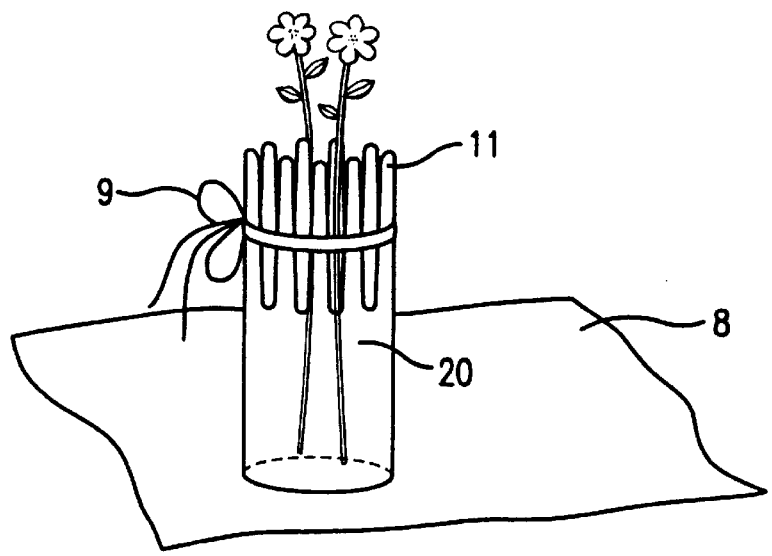
FIG. 9 representing the device formed with its sheet and its bunch of flowers.
Figure 10:
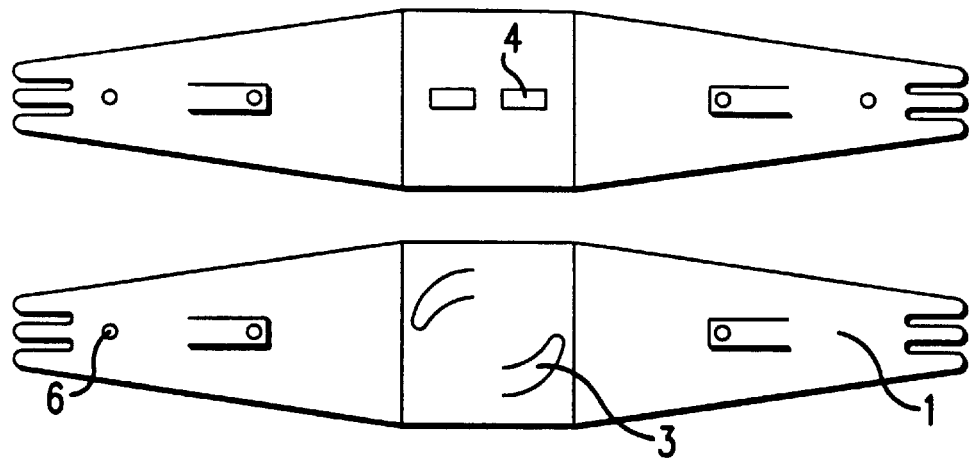
FIG. 10 representing the square device flat with base.
Figure 11:
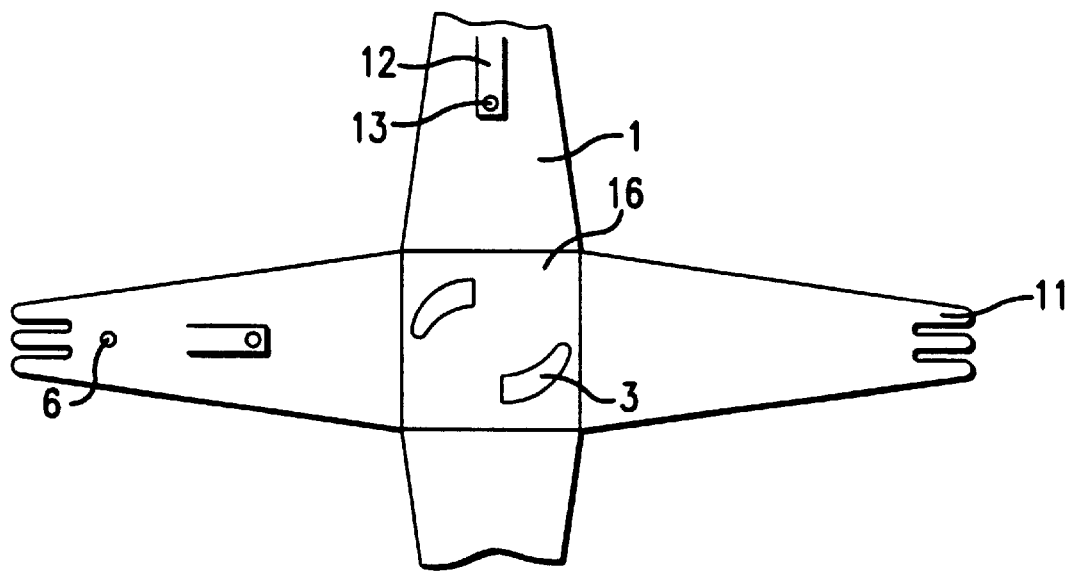
FIG. 11 representing the square device formed.
Figure 13:
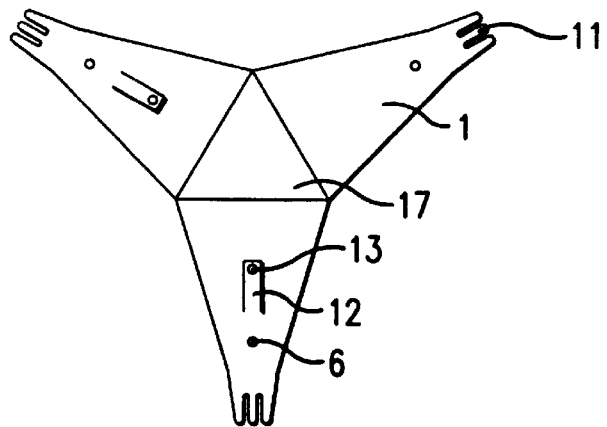
FIG. 13 representing the triangular device flat with base.
Figure 14:
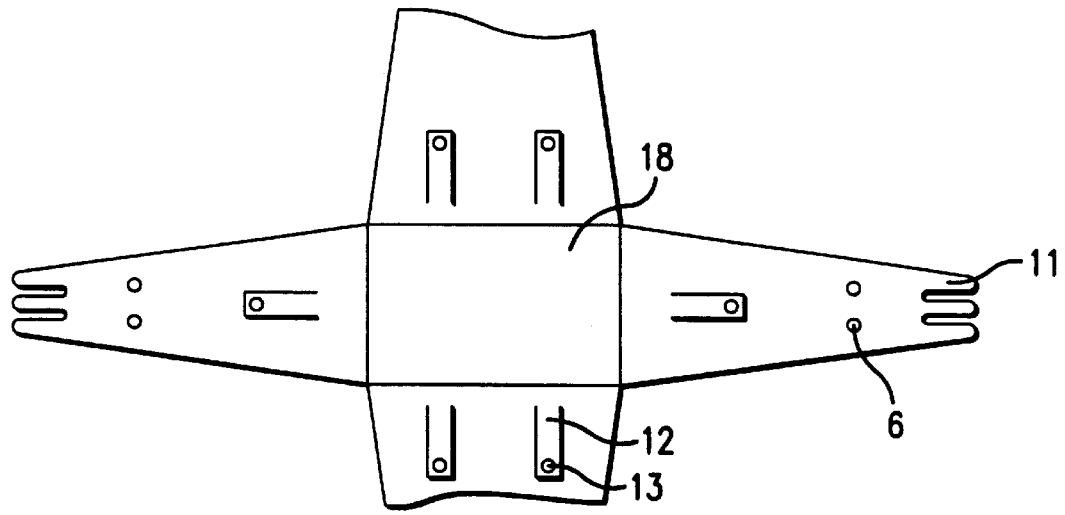
FIG. 14 representing the rectangular or other-shaped device flat with base.
Figure 15:
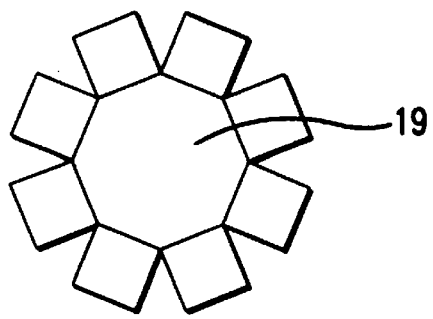
FIG. 15 representing the device acting as base able to be adapted to all models.

This tie can also have the same result by tightening the tongues (11). The radius of definition of the support keeping the same principle enables cones of different shape and volume to be formed as indicated in FIGS. 7 and 8.

The invention according to the principle of folding of the conventional bouquet, is formed by the device and a watertight sheet (8) folded upwards and pre-fastened to the device by means of adhesive tabs (7) for ease of shaping of the sheet. The tongues (11) enable a second final attachment above the tie (9), by a decorative ribbon (21) holding the sheet (8) against the flexible tongues (11) which press on the stalks of the flowers.

At that moment, the bouquet is completely secured to the device. Filling with water poured in through the opening (5) and collecting in the base (2) ensures preservation of the flowers.

The weight of the water (10) provides the stability of the assembly by ballasting and the device becomes a disposable vase.

For high arrangements with very few flowers, tabs (12) pierced with openings (13) can be fitted internally to hold the stalks of certain flowers. Round (14) or square (15) collars can be fitted onto all the devices.

Devices according to the same principle can be designed, which are square (16), triangular (17), rectangular (18), with a base for certain tropical flowers.

A base (19) can be fitted onto most devices.

A cylindrical device according to the same principles (20), of different length, enables flowers to be transported from the producing countries to consumer countries guaranteeing their freshness with only very little water.

The device according to the invention enables bouquets to be made up inexpensively, without having recourse to conventional vases, enabling them to be given as gifts and kept.

What is claimed is:

1. A bouquet of flowers presentation device, comprising:
a foldable support having an adjustment system including a plurality of clippings, wherein any one of the clippings is insertable into one of a plurality of adjustment slots to transform the support into a volume having a top part and a bottom part;
a plurality of tongues arranged at the top part of the transformed support to provide the transformed support with a variable opening at the top part to accommodate an arrangement of the bouquet;
a tie which is wrapped around a lower end of each of the plurality of tongues to form a first fixing point enabling an individual to fold each tongue of the plurality of tongues over the tie to permit the presentation of the bouquet;
a water-tight sheet placed under the bottom part of the transformed support, the water-tight sheet being folded upward toward the top part along an outside surface of the transformed support; and
a ribbon placed above the tie to form a second fixing point, the ribbon secures the water-tight sheet against the tongues to allow water to be poured into the variable opening at the top part of the transformed support.

2. The device according to claim 1, wherein the transformed support is a sheet folded into a shape resembling one of either a cone and a cylinder.

3. The device according to claim 2, further comprising adhesive tabs beneath the plurality of tongues to keep the water-tight sheet in place before the ribbon is placed above the tie.

4. The device according to claim 2, further comprising pierced tabs located beneath the plurality of tongues to stabilize the bouquet.

5. The device according to claim 2, further comprising either one of a round collar and a square collar that is fitted to the top part to form a disposable flower-bowl.

6. The device according to claim 2, further comprising an additional round-shaped part fitted to the bottom part of the transformed support.

7. The device according to claim 1, further comprising at least two openings positioned beneath the plurality of tongues for receiving the tie enabling the transformed support to be secured to the bouquet.

8. The device according to claim 1, further comprising a base having a shape resembling one of either a square, a triangle, and a rectangle.

9. The device according to claim 1, wherein the foldable support is achieved by one of cutting, thermoforming, and by injecting molding.

10. The device according to claim 1, wherein the foldable support is a translucent, water-resistant sheet.

11. The device according to claim 1, wherein the device has a round base.

* * * * *